(12) United States Patent
Takahashi et al.

(10) Patent No.: US 6,694,598 B2
(45) Date of Patent: Feb. 24, 2004

(54) METHOD AND APPARATUS FOR MANUFACTURING STATOR OF ROTARY ELECTRIC MACHINE

(75) Inventors: Makoto Takahashi, Okazaki (JP); Youichi Kamakura, Anjo (JP); Masaru Sugiyama, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/230,168

(22) Filed: Aug. 29, 2002

(65) Prior Publication Data

US 2003/0005579 A1 Jan. 9, 2003

Related U.S. Application Data

(62) Division of application No. 09/758,169, filed on Jan. 12, 2001.

(30) Foreign Application Priority Data

Jan. 12, 2000 (JP) ........................................ 2000-006362

(51) Int. Cl.[7] .............................................. H02K 15/16
(52) U.S. Cl. ......................................... 29/596; 310/179
(58) Field of Search .......................... 29/596, 598, 605, 29/606; 242/432; 310/132, 179, 180

(56) References Cited

U.S. PATENT DOCUMENTS

| 1,555,931 A | 10/1925 | Apple |
| 3,803,951 A | 4/1974 | Bagley |
| 3,999,093 A | 12/1976 | Kirtley, Jr. |
| 4,437,230 A | 3/1984 | Greutmann |
| 5,363,546 A | 11/1994 | Bradtmueller et al. |
| 5,495,131 A | 2/1996 | Goldie et al. |
| 5,982,068 A | 11/1999 | Umeda et al. |
| 6,144,136 A | 11/2000 | Umeda et al. |
| 6,339,871 B1 * | 1/2002 | Maesoba et al. ............ 29/596 |
| 2001/0013167 A1 * | 8/2001 | Maeda et al. ............. 29/596 |
| 2002/0053126 A1 * | 5/2002 | Maeda et al. ............. 29/596 |

FOREIGN PATENT DOCUMENTS

| DE | 1030435 | 5/1958 |
| DE | 1190555 | 4/1965 |
| JP | 359103546 A | 6/1984 |
| JP | 60-241748 | 11/1995 |
| WO | 92/06527 | 4/1992 |
| WO | 98/54823 | 3/1998 |

* cited by examiner

Primary Examiner—Gregory Vidovich
Assistant Examiner—Stephen Kenny
(74) Attorney, Agent, or Firm—Oliff & Berridge, PLC

(57) ABSTRACT

A method for manufacturing a stator of a rotary electric machine includes: a step of forming a plurality of conductor segments each having at least a straight leg; a step of inserting the plurality of conductor segments into each of the slots in a plurality of radially aligned layers so that the straight legs can extend outside an end of the stator core; a step of stratifying the straight legs in radially aligned layers to correspond to the layers in the slots; a step of holding each of the stratified portions at grip portions; a step of circumferentially shifting each of the grip portions in a prescribed circumferential direction of the stator core; and a step of axially shifting each of the grip portions separately from another in an axial direction of the stator core to locate those of the grip portions to be connected adjacent to each other.

5 Claims, 11 Drawing Sheets

METHOD AND APPARATUS FOR MANUFACTURING STATOR OF ROTARY ELECTRIC MACHINE

CROSS REFERENCE TO RELATED APPLICATION

This is a Division of Application Ser. No. 09/758,169 filed Jan. 12, 2001. The entire disclosure of the prior application is hereby incorporated by reference herein in its entirety.

The present application is based on and claims priority from Japanese Patent Application 2000-6362 filed on Jan. 12, 2000, the contents of which are incorporated herein by reference.

BACKGROUND OF THE INVENTION

1. Field of the Invention

The present invention relates to method of manufacturing a stator of a rotary electric machine such as an ac generator for a vehicle and, particularly, a method of twisting a plurality of conductor segments, which are welded to one another to form a stator coil.

2. Description of the Related Art

In order to meet the demand of a high-power vehicle ac generator, the following stator has been proposed. In the stator, I or U-shaped conductor segments are inserted into a plurality of slots of a stator core in one direction and welded to form a stator coil. Because the conductor segments can be regularly disposed in the stator core, the stator of this type provides a high conductor space factor and a high power capacity.

In order to provide such a stator coil from the above-described conductor segments, it is necessary to connect ends of the conductor segments to one another. WO92/06527 discloses a method of forming a stator coil by connecting a plurality of conductor segments disposed in a stator core.

In the above conventional technology, there are outer conductor segments inserted in the radially outer layer of the slots and inner conductor segments disposed in the radially inner layer of slots. Straight portions of the inner conductor segments and outer conductor segments are respectively twisted a half pole-pitch by twisting tools in the circumferential directions of the stator core opposite to each other. Thereafter, the ends of those of the conductor segments that are twisted are welded to adjacent ends of other conductor segments that are also twisted in the same manner to form a stator coil.

The twisting tools in the conventional method move only in the circumferential directions of the stator core. Although the segment's ends can be properly located in the circumferential direction, they can not be located properly in the axial direction.

If the twisting tools are rotated the same angle, the ends of the outer conductor segments shift more than the ends of the inner conductor segments. In other words, if both the outer and inner conductor segments extending in the axial direction from the stator core have the same height, the outer conductor segments become lower than the inner conductor segments after they are twisted.

Accordingly, it is not possible to connect the outer and inner conductor segments without relocation of the conductor segments.

SUMMARY OF THE INVENTION

Therefore, an object of the invention is to provide an improved method of manufacturing a stator in which a plurality of conductor segments is disposed in a plurality of radially aligned layers of slots of a stator core. In the improved method, a plurality of outer and inner conductor segments extending from outer and inner layers of slots is twisted and located at desired positions to be readily connected to form a stator coil.

A main feature of the invention is a method for manufacturing a stator of a rotary electric machine that includes the following steps: forming a plurality of conductor segments each having at least a straight leg, inserting the plurality of conductor segments into slots of a stator core in a plurality of radially aligned layers so that the straight legs can extend from an end of the stator core, stratifying the straight legs in radially aligned layers to correspond to the layers in the slots, holding each of the straight legs at grip portions; circumferentially shifting each of the grip portions in a prescribed circumferential direction of the stator core; and axially shifting each of the grip portions separately from another in an axial direction of the stator core to locate those of the grip portions to be connected adjacent to each other.

According to a second feature of the invention, the straight legs are formed so that those of the grip portions of the legs disposed in radially more outside layer are higher.

The circumferential shift of the grip portions increases as the grip portions are disposed more radially outside. Therefore, the height of the grip portions disposed in the radially more outside layer is set higher so that the height of all the grip portions disposed in the respective layers can be made equal after they are twisted.

According to a third feature of the invention, each of the grip portions is shifted the same angle in the circumferential direction in the circumferentially shifting step, and each of the grip portions is shifted in the axial direction until all the heights become equal in the axially shifting step.

Therefore, the grip portions adjacent to each other can be easily connected.

According to a fourth feature of the invention, the grip portions are held so that distances between the grip portions and the end of the stator core can be equal to each other.

According to another feature of the invention, the grip portions are shifted the same angle in the circumferential directions, and the grip portions are separately shifted in the axial direction so that a length of one of the grip portions disposed in a radially more outside layer is shorter than another.

In the meantime, in an ordinary ac generator, cooling air is supplied outward from a radially inside portion of stator core 1. According to this feature of the invention, the axial position of the grip portions disposed in radially more outside layer is different from the axial position of those disposed in another layer.

According to another feature of the invention, the grip portions are held so that the length of one of the grip portions from the end of the stator core disposed in a radially more outside layer is longer.

Therefore, the height of the grip portions disposed in all the layers after being twisted are made equal to each other.

According to another feature of the invention, all the grip portions are shifted the same angle in circumferential directions, and the grip portions are separately shifted in the same axial direction so that the grip portions disposed in all the layers become equal in length.

According to another feature of the invention, the grip portions are held at circumferential sides thereof.

According to another feature of the invention, the grip portions are held while the grip ends thereof abut bottoms of cavities of holding members. Therefore, the grip portions are protected from damage.

According another feature of the invention, each of holding members have rectangular cavities for holding the grip portions to twist the extended legs.

Therefore, the holding members of the twisting means can be made simple.

According to another feature of the invention, a twisting apparatus includes a plurality of twisting tools moving in a circumferential direction of the stator core and in a axial direction thereof, circumferential driving units for moving the twisting tools in circumferential directions, and axial driving units for separately moving the twisting tools.

In this specification, the circumferential direction of the stator core is referred to as the core-circumference direction, and the axial direction of the stator core is referred to as the core-axis direction.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
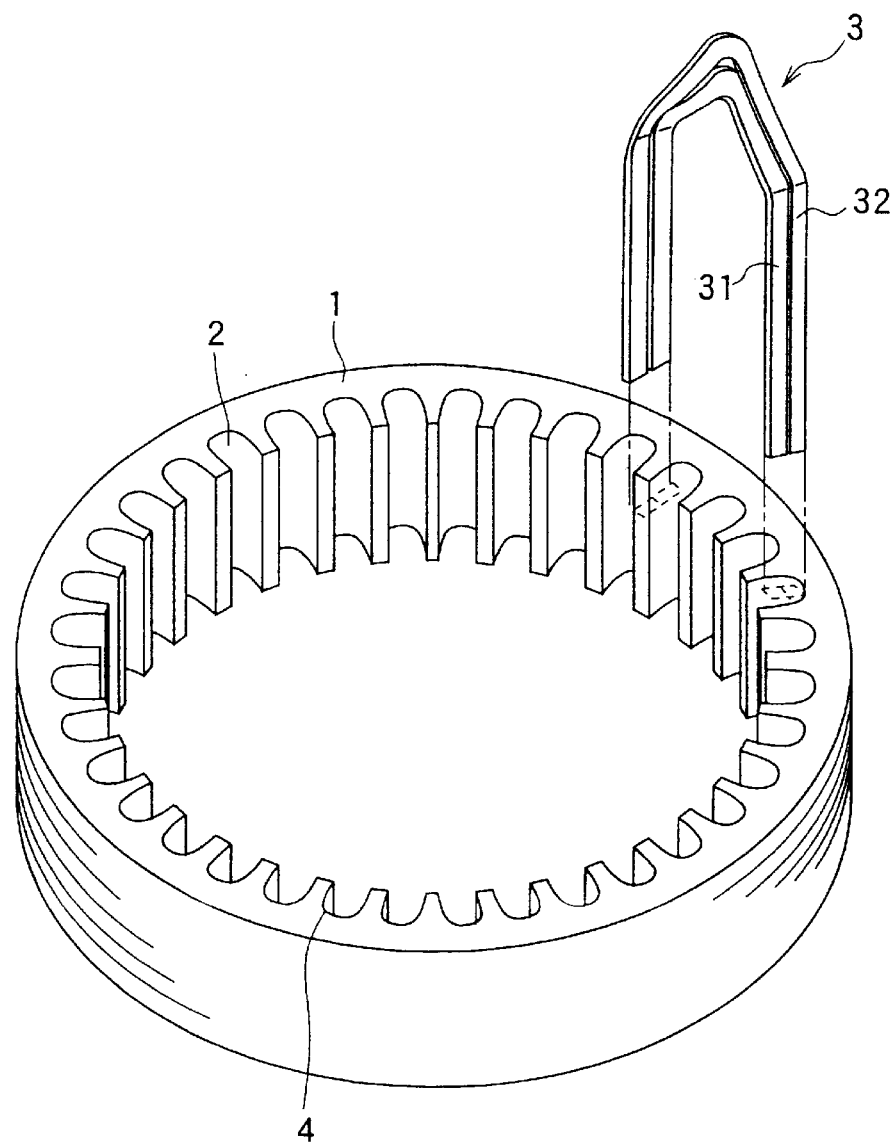
FIG. 1 is a perspective view illustrating conductor segments being inserted into a stator core according to a first embodiment of the invention.

A method of manufacturing a stator of a vehicle ac generator according to a first embodiment of the invention is described with reference to FIGS. 1–10.

The stator of a vehicle ac generator includes cylindrical stator core 1 having equally spaced 36 slots 2, a three-phase stator coil formed of a plurality of pairs of U-shaped conductor segments 3 and insulation films 4 that insulate conductor segments 3 from stator core 1. The plurality of conductor segments is disposed in four radially aligned layers in the plurality of slots 2.

The pair of U-shaped conductor segments is formed of large segment 31 and small segment 2.

Each of segments 31 and 32 has a radially inner portion and radially outer portion and turn portion 31a or 32a. That is, each of segments 31 and 32 has first inclined portions 31b and 31c or 32b and 32c at the opposite ends of turn portions 31a or 32a that are disposed outside slot 2, in-slot portions 31d and 31e or 32d and 32e that are disposed in slots 2, and second inclined portions 31f and 31g or 32f and 32g that are disposed outside slots 2. The ends of second inclined portions 31f, 31g, 32f and 32g correspond to grip portions 31i, 32i, 32h and 31h held by holding section of twisting tools. Each of grip portions 31i, 32i, 32h and 31h has chamfered corner 31j or 32j at a radial side thereof. Turn portion 31a or 32a and first inclined portions 31b and 31c or 32b and 32g form a first outside extension, and second inclined portions 31f and 31g or 32f and 32g and grip portions 31h and 31i or 32h and 32i form a second outside extension.

A manufacturing process of the conductor segments is described with reference to FIG. 2. Since the manufacturing process of the segments 31 and 32 is the same, only the process of manufacturing small segments 32 will be described hereafter. Firstly, a copper wire is bent into a U-shape having two legs, as shown by dotted lines in FIG. 2. Secondly, first inclined portions 32b and 32c are formed by twisting portions around turn portion 32a in opposite directions as indicated by arrows A. Finally, both the legs are bent at the middle thereof as shown by solid lines in FIG. 2. The radially outside leg is longer than the inside leg.

Thereafter, segments 31 and 32 are coupled so that turn portion 32a of small segment 32 can be surrounded by turn portion 31a of large segment 31, and inserted into a pair of slots at the same time so that each of radially outer in-slot portions 31e and 32e can be disposed at the back two layers in one slot 2, and so that each of radially inner in-slot portions 31d and 32d is disposed at the front two layers in another slot 2. The radially outer in-slot portion and the radially inner in-slot portion of each segment are inserted into the paired slots that are a predetermined pitch T (e.g. 3 slot-pitches) spaced apart from each other. Thus, segments 31 and 32 are inserted into respective slots 2 so that segments 31 and 32 are disposed in each slot in radially aligned four layers. In other words, radially outer in-slot portions 31e and 32e of large and small segments 31 and 32 are respectively disposed in an outermost layer (hereinafter referred to as the first layer) and an outer middle layer (hereinafter referred to as the second layer) of one of the slots 2 and radially inner in-slot portions 32d and 31d of small and large segments 32 and 31 are respectively disposed in an inner middle layer (hereinafter referred to as the third layer) and an innermost layer (hereinafter referred to as the fourth layer) of another slot 2 that is pitch T spaced apart from each other.

As stated above, the outside legs that include in-slot portions 31e and 32e, second inclined portions 31g and 32g and grip portions 31i and 32i are made longer than the inside leg that include in-slot portions 31d and 32d, second inclined portions 31f and 32f and grip portions 31h and 32h. When a pair of large and small segments 31 and 32 is inserted into one of slots 2, grip portions 31*i*, 32*i*, 32*h* and 31*h* extend outward in the core-axis direction from an end of the stator core in four layers that correspond to the first-fourth layers of slots 2. Heights H1–H4 of grip ends 31*m*, 32*m*, 32*k* and 31*k* of grip portions 31*i*, 32*i*, 32*h* and 31*h* from an end of stator core in the core-axis direction are arranged to be higher as the grip end is disposed in a more radially outside layer, as shown by broken lines in FIG. 5.

After conductor segments 3 are inserted into the plurality of slots 2, the legs of the segments extending outward from the slots are twisted in the core-circumference direction.

Figure 5:
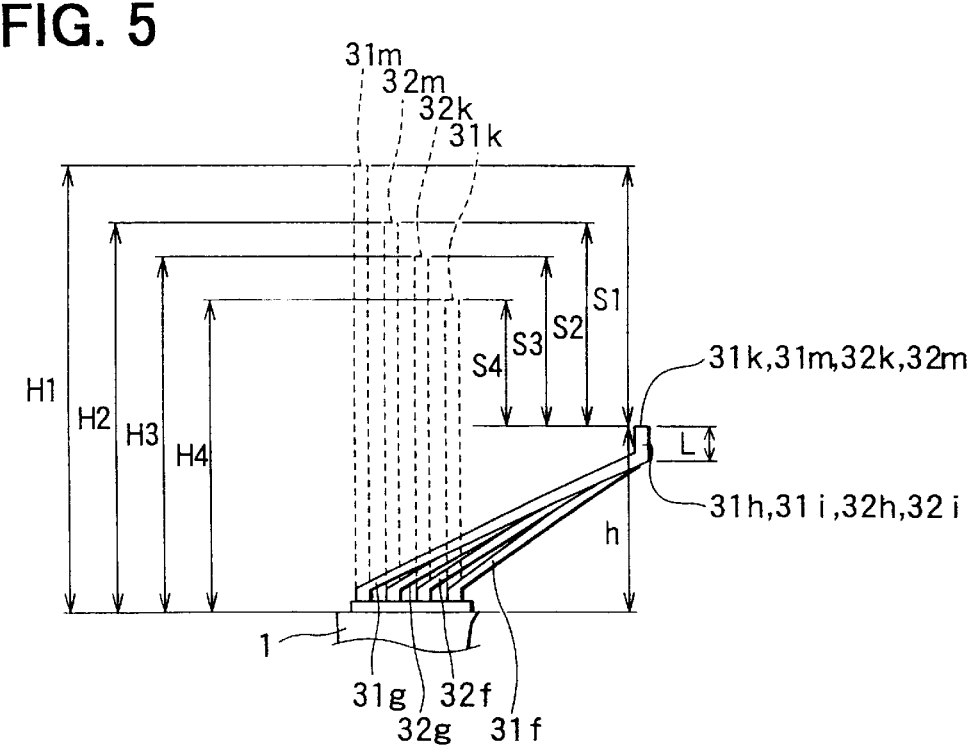
FIG. 5 is a schematic side view illustrating the conductor segments before and after being twisted by the method according to the first embodiment.

Heights H1–H4 are arranged beforehand so that all grip ends 31*m*, 32*m*, 32*k* and 31*k* can have the same height h after the respective legs are twisted the same angle in the circumferential direction as shown by the solid lines in FIG. 5.

In more detail, the legs are alternately twisted a half pole-pitch (T/2) in opposite directions. The legs disposed in the first and third layers from the radially outermost layer are clockwise twisted 1.5 slot-pitch viewed from grip ends 31*m*, 32*m*, 32*k* and 31*k*, and the legs disposed in the second and fourth layers are counter-clockwise twisted 1.5 slot-pitch.

Thereafter, the adjacent grip ends 31*k* and 32*k* disposed in the first and second layers and the adjacent grip ends 32*m* and 31*m*, disposed in the third and fourth layers are welded or soldered to each other to form a three-phase stator coil by means of TIG welding, brazing, resistance welding, electron beam welding, laser welding, or soldering.

Twisting apparatus 5 is described with reference to FIGS. 6–10.

Twisting apparatus 5 includes worktable 51 that supports the lower peripheral portion of stator core 1, clamp 52 that restricts the radial shift of stator core 1, presser 53 that restricts hopping of stator core 1, twisting tool section 54 that twists the legs of conductor segments 3, shafts 551–554 that are connected to twisting tool section 54, circumferential drive units 561–564 that turn twisting section 54 in the circumferential directions via shafts 551–554, axial drive units 571–574 that move twisting tool section 54 via shaft 551–554 in the core-axis directions, and controller 58 that controls circumferential drive units 561–564 and axial drive units 571–574. In the meantime, circumferential drive units 561–564 and axial drive units 571–574 are driven by servomotors or the like.

Twisting tool section 54 is comprised of coaxially disposed four cylindrical first, second third and fourth twisting tools 541–544. Each of twisting tools 541–544 can be separately rotated by one of circumferential drive units 561–564, and also separately moved up or down by one of axial drive units 571–574.

Figure 7:
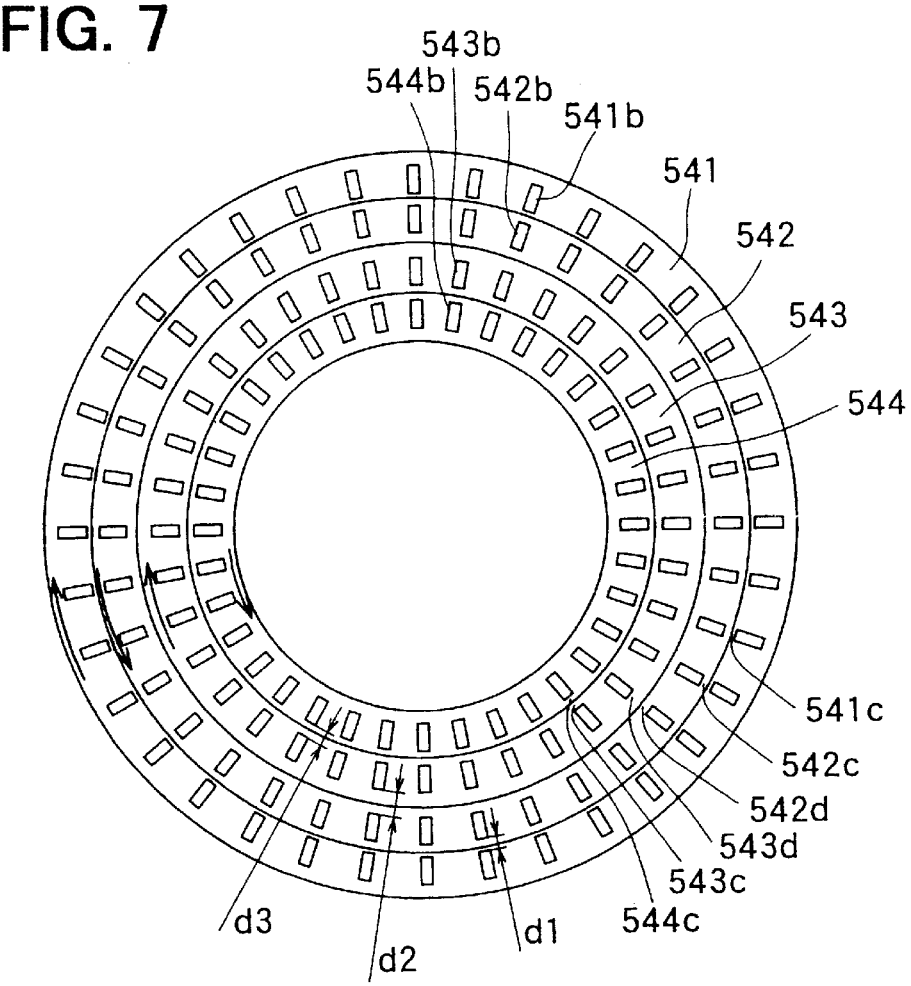
FIG. 7 is a schematic cross-sectional view of a portion cut along line VII—VII in FIG. 6.

As shown in FIG. 7, twisting tools 541–544 respectively have holding members 541*b*–544*b* at the upper portion thereof. Each of holding members 541*b*–544*b* has as many cavities aligned in the circumferential direction as slots 2 of stator core 1. First holding member 541*b* holds grip portions 31*i* extending in the first layer, second holding member 542*b* holds grip portions 32*i* extending in the second layer, third holding member 543*b* holds grip portions 32*h* extending in the third layer, and fourth holding member 544*b* holds grip portions 31*h* extending in the fourth layer. Each cavity of one of holding members 541*b*–544*b* holds one of grip portions 31*i*, 32*i*, 32*h* and 31*h*. For this purpose, each cavity of holding members 541*b*–544*b* has a rectangular cross-section and a depth that is the same as others.

There are annular partitions 541*c*–544*c*, 542*d*, 543*d* between cavities of each of holding members 541*b*–544*b*. Thickness d2 of two partitions 542*d* and 543*d* between the cavities of the second and third holding members 542*b* and 543*b* is thicker than thickness d1 of two partitions 541*c* and 542*c* of the first and second holding members 541*b* and 542*b* and also thickness d3 of two partitions 543*c* and 544*c* of third and fourth holding members.

Figure 6:
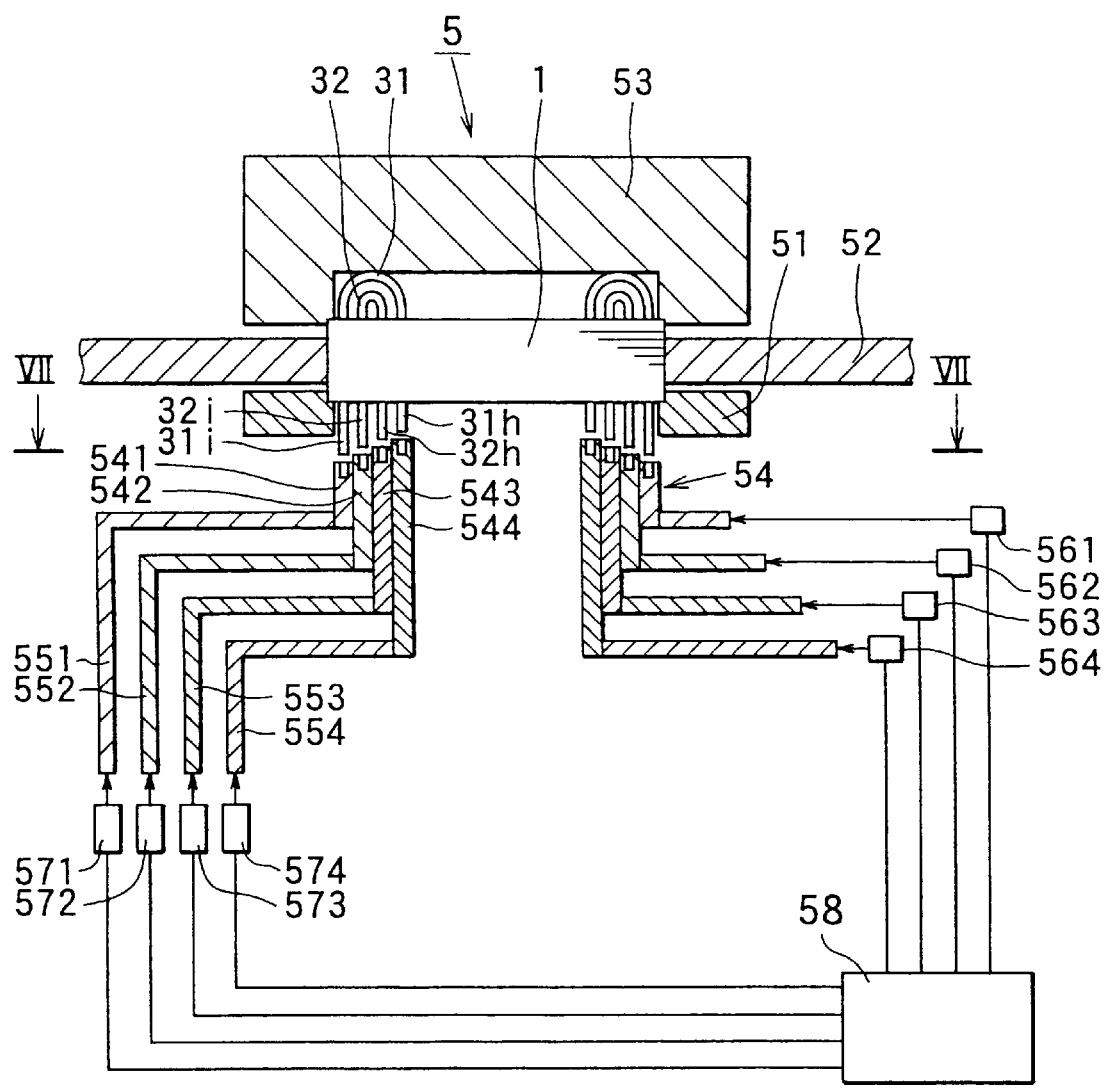
FIG. 6 is a schematic longitudinal cross-sectional view of a twisting apparatus used in the method according to the first embodiment.

Operation of twisting apparatus 5 is described next. Stator core 1 with conductor segments 3 being inserted in slots 2 is set on worktable 51. Then the outer periphery of stator core 1 is clamped by clamp 52. Thereafter, stator core 1 is pressed by presser 53 at an upper portion thereof and at turn portion 31*a* of large segment 31 to restrict up-down motion of stator core 1 and conductor segments 3. At this stage, the height of straight legs of conductor segments 3 disposed in a more outside layer is higher. The upper surface of radially outer one of holding members 541*b*–544*b* is disposed lower so that distances between grip ends 31*k*, 31*m*, 32*k*, 32*m* and the upper surface can be equal, as shown in FIG. 6.

After stator core 1 is fixed by clamp 52 and presser 53, axial drive units 571–574 move twisting tools 541–544 upward, and grip ends 31*m*, 32*m*, 32*k* and 31*k* are respectively inserted into the cavities of holding members 541*b*–544*b*. At this stage, twisting tools 541–544 are moved up until grip ends 31*m*, 32*m*, 32*k* and 31*k* abut the bottom of the cavities of holding members 541*b*–544*b*. Since chamfered corners 31*j* and 32*j* are formed at grip portions 31*i*, 32*i*, 32*h* and 31*h*, grip portions 31*i*, 32*i*, 32*h* and 31*h* can be smoothly inserted into holding members 541*b*–544*b*, and quality of welding is improved.

Thereafter, twisting tools 541–544 are rotated and moved down by circumferential drive units 561–564 and axial drive units 571–574. Although all twisting tools 541–544 are moved up and down concurrently, the moving distance is different from each other. First and third twisting tools 541 and 543 are rotated the same angle clockwise in FIG. 7, and second and fourth twisting tools 542 and 544 are rotated the same angle counter-clockwise.

Figure 8:
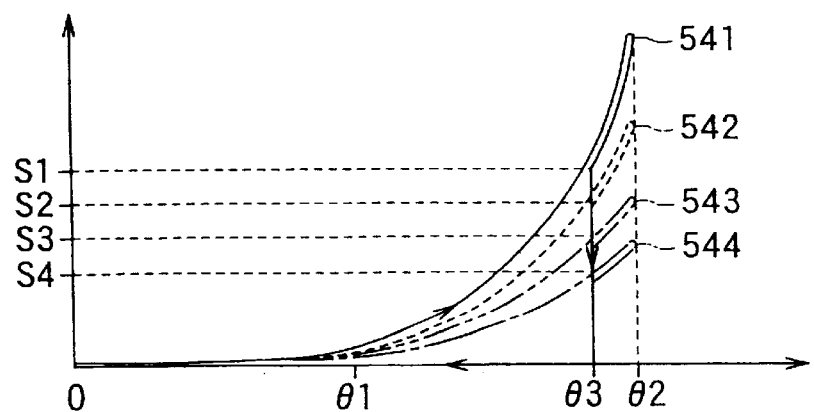
FIG. 8 is a graph showing operation of twisting tools used in the method according to the first embodiment.
Figure 9:
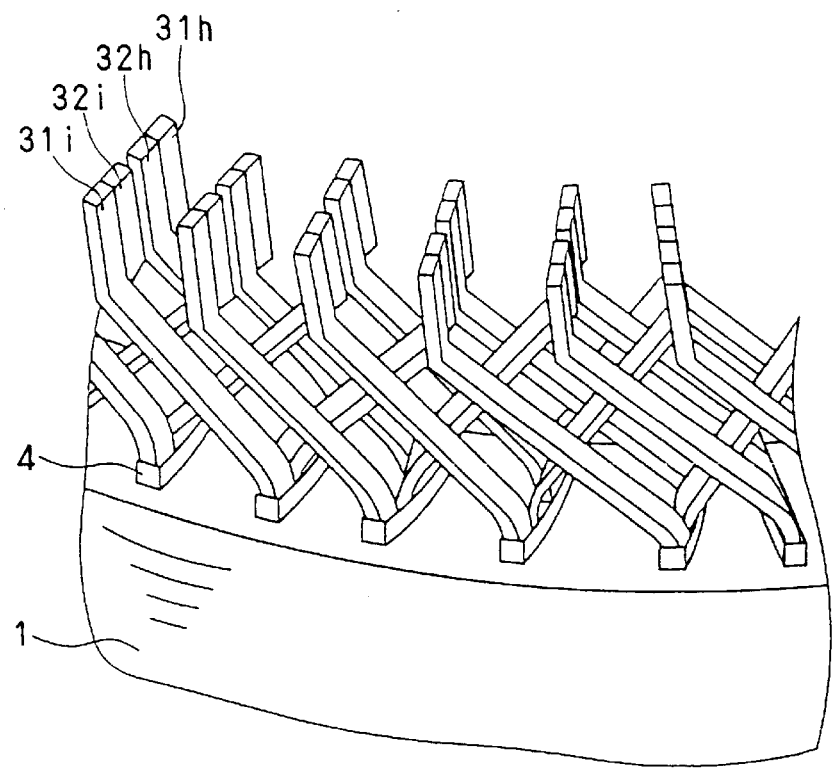
FIG. 9 is a perspective view of the stator after the conductor segments are twisted according to the first embodiment.

FIG. 8 is a graph showing relationship between the up-down motion and rotation of twisting tools 541–544. Firstly, controller 58 controls circumferential drive units 561–564 to only rotate twisting tools 541–544 angle θ1, where the legs of conductor segments 3 are bent at the front of slots 2 and at the front of the cavities of holding members 541*b*–544*b* to provide inclined portions.

Thereafter, controller 58 controls circumferential drive units 561–564 and axial drive unit 571–574 to rotate and move up twisting tools 541–544 so that grip portions 31*i*, 32*i*, 32*h* and 31*h* can draw an arc. At this stage, each of twisting tools 541–544 moves up and down separately in response to the arching of grip portions 31*i*, 32*i*, 32*h* and 31*h*. This motion of arching is carried out up to angle θ2 that is larger than predetermined angle θ3 of the half pole-pitch (T/2), so that conductor segments 3 can be prevented from deforming from second incline portions 31*g*, 32*g*, 32*f* and 31*f* due to spring back. Each of twisting tools 541–544 is controlled to move in the core-axis direction a distance that is longer than predetermined distance S1, S2, S3 or S4, as shown in FIG. 5.

Thereafter, twisting tools 541–544 are respectively rotated and moved in the opposite direction back to the position of angle θ3 and distance S1–S4. Then, twisting tools 541–544 are lowered to remove grip portions 31*i*, 32*i*, 32*h* and 31*h* from holding members 541*b*–544*b*.

Subsequently, clamp 52 and presser 53 are removed, and the stator having the twisted legs is taken out. Thereafter, adjacent grip portions 31*h* and 32*h*, and 32*i* and 31*i* are welded to form a three-phase stator coil having a prescribed number of turns.

Figure 10:
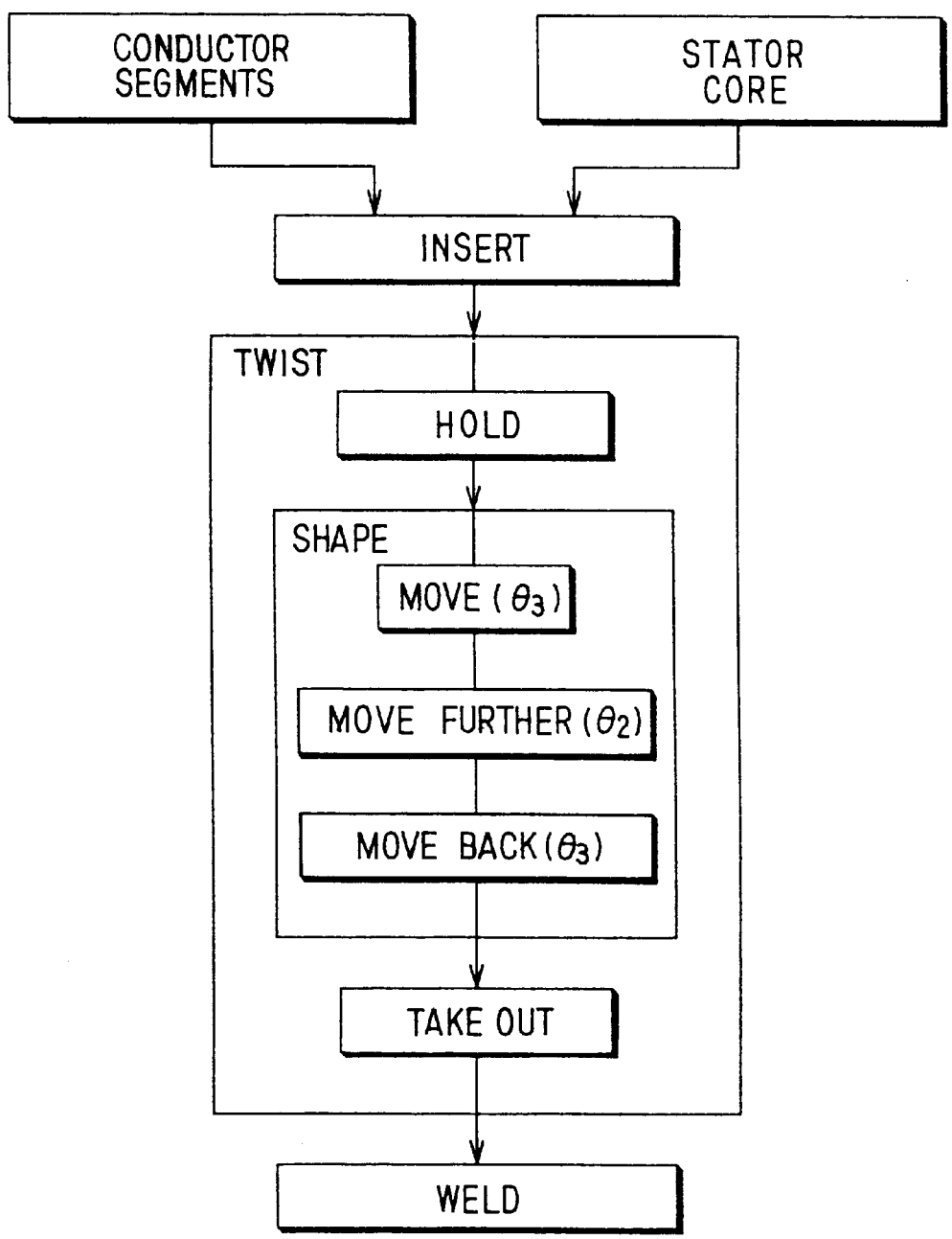
FIG. 10 is a flow diagram showing steps of manufacturing a stator according to the first embodiment.

The above-described method of manufacturing a stator is shown in a flow diagram in FIG. 10.

Figure 2:
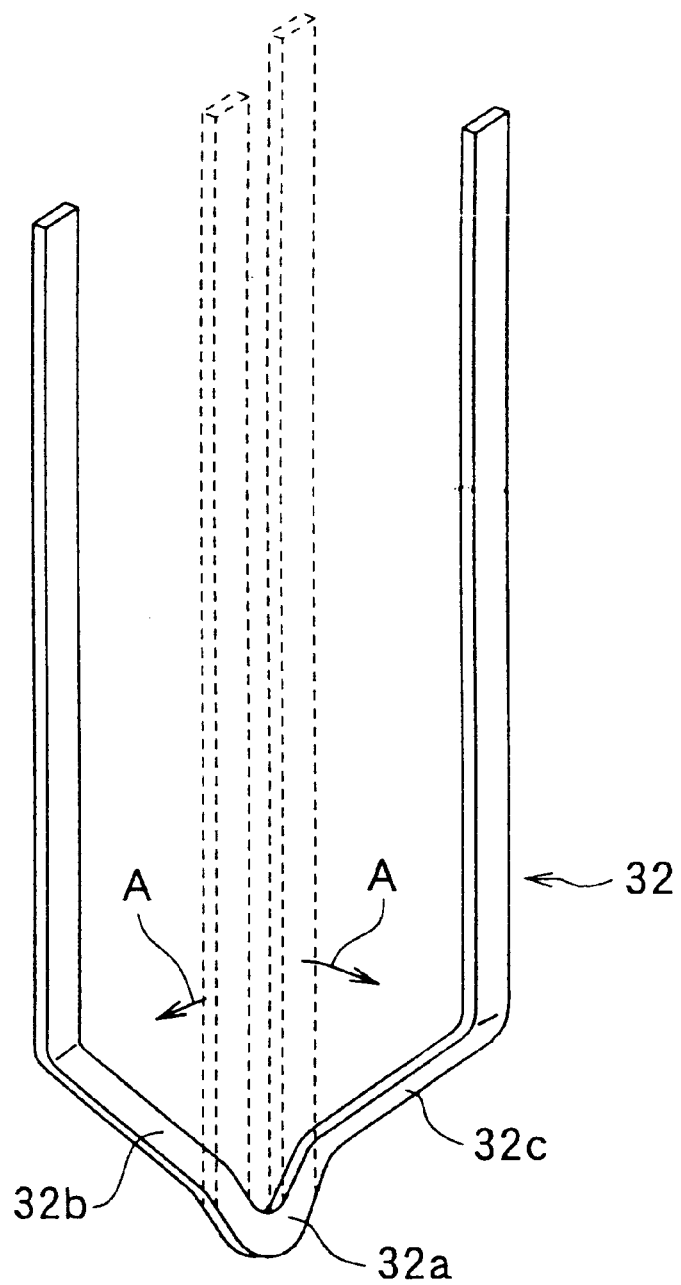
FIG. 2 is a perspective view illustrating the conductor segment shown in FIG. 1.
Figure 3:
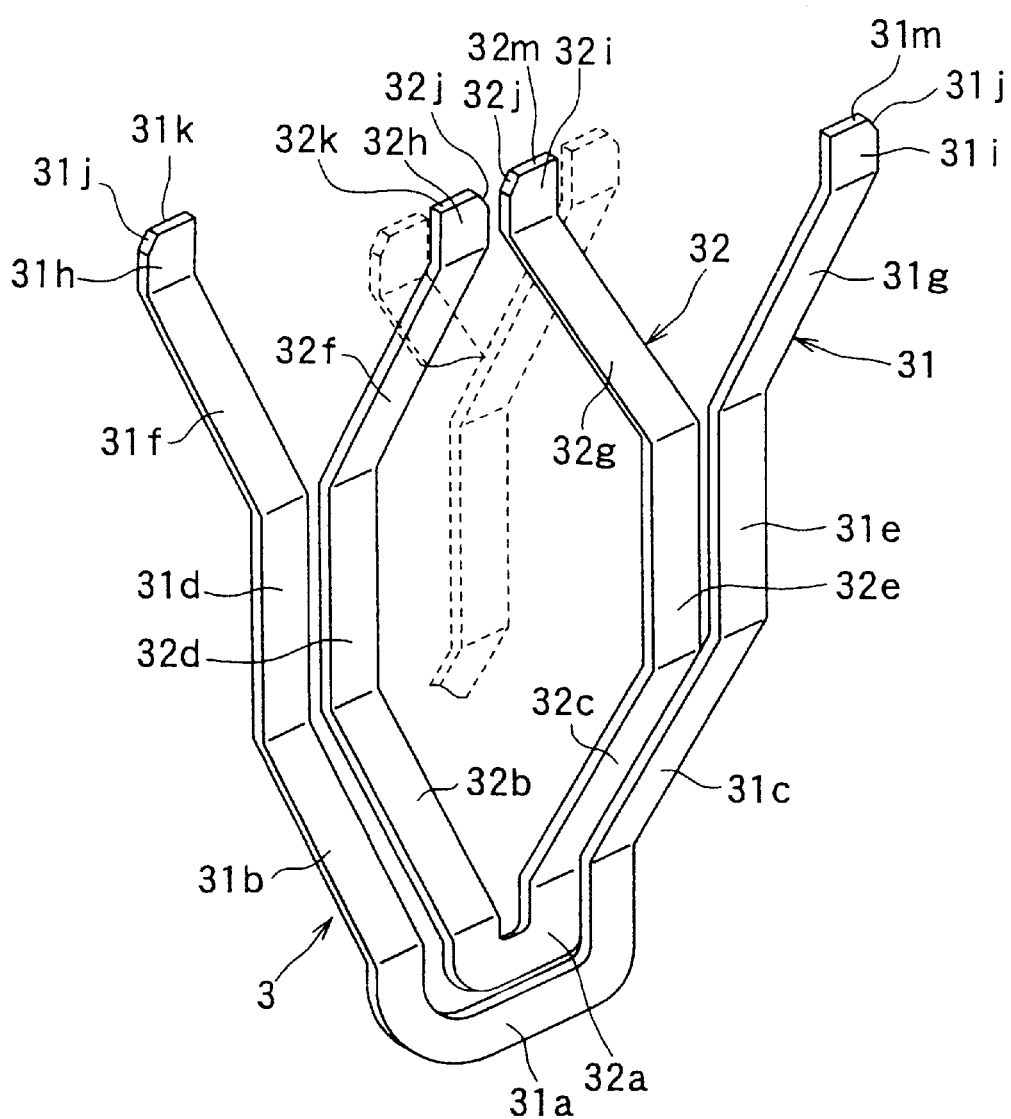
FIG. 3 is a perspective view illustrating the segment in the final step according to the first embodiment.
Figure 4:
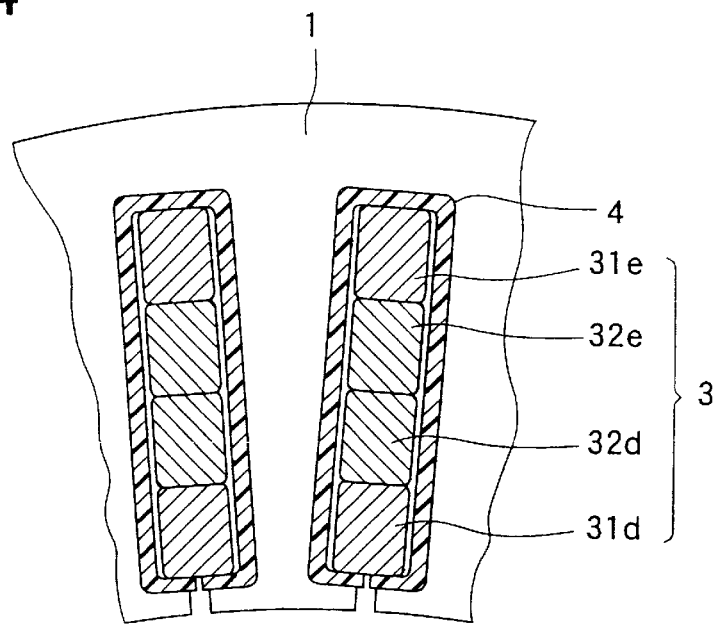
FIG. 4 is a cross-sectional view illustrating the conductor segments disposed in slots of the stator core.

At first, a plurality of conductor segments 3 is formed, as shown in FIG. 2, and stator core 1 is also formed of laminated sheets. Then, the plurality of conductor segments 3 is inserted into respective slots 2 in the core-axis direction. Thereafter, conductor segments 3 are twisted, and those of adjacent grip portions 31i, 32i, 32h and 31h are welded to one another.

There are two ways of inserting conductor segments 3. In one way, a plurality of conductor segments 3 is arranged before being inserted. In the other way, conductor segments 3 are inserted into stator core 1 one by one.

The step of twisting includes a step of loading a stator with conductor segments 3 to twisting apparatus 5, as shown in FIG. 6, a step of inserting grip portions 31i, 32i, 32h and 31h into the respective cavities of holding members 541b–544b, a shifting step shown in FIG. 8 and a step of taking out the shaped stator.

In the shifting step, grip portions 31i, 32i, 32h and 31h are rotated angle θ1 to bend the legs of conductor segments 3, grip portions 31i, 32i, 32h and 31h are respectively moved more than prescribed angle θ3 and distances S1–S4. Grip portions 31i, 32i, 32h and 31h are respectively moved back to positions of angle θ3 and distances S1–S4.

Here, twisting tools 541–544 can move relative to stator core 1 not only in the core-circumference direction but also in the core-axis direction. In other words, twisting tools 541–544 can be move in three-dimensional directions. Each of four twisting tools 541–544 can move up and down separately from each other.

For example, if twisting tools 541–544 are rotated the same angle in prescribed directions, the heights H1–H4 of the grip portion before the legs are twisted are set so that the grip portion disposed at radially more outside can be higher, taking it into account that a more outside grip portion moves longer distance in the core-circumference direction. It is possible to respectively set vertical-moving distances S1–S4 of twisting tools 541–544 so as to make the height h after the legs are twisted equal to each other. This makes the welding of grip portions 31h and 32h, and 31i and 32i easy and sure.

Because twisting tools 541–544 move three-dimensional directions relative to stator core 1, grip portions 31i, 32i, 32h and 31h can be deformed so that the second inclined portions 31f, 31g, 32f and 32g can be kept unchanged. Therefore, grip portions 31i, 32i, 32h and 31h of conductor segments 3 can be prevented from slipping off from holding members 541b–544b of twisting tools 541–544.

Because each of twisting tools 541–544 moves up and down separately as grip portions 31i, 32i, 32h and 31h move in response to the rotation of twisting tools 541–544, grip portions 31i, 32i, 32h and 31h are prevented from moving in holding members 541b–544b. Therefore, grip portions 31i, 32i, 32h and 31h can be protected from damage. In particular, the portions of grip portions 31i, 32i, 32h and 31h near cavities of holding members 541b–544b can be protected from damage.

All the cavities of four holding members 541b–544b are formed to have the same depth and grip ends 31k, 31m, 32k, 32m of holding members 541b–544b are inserted in the cavities to abut the bottoms thereof. Thus, the grip portions 31i, 32i, 32h and 31h are made to have the same length L, as shown in FIG. 5 in the core-axis direction, which is sufficient for the welding.

It is possible to rotate twisting tools 541–544 in the circumferential direction separately from each other. Therefore, all conductor segments 3 extending from the respective layers in slots 2 can be twisted in the most suitable manner.

Because twisting tools 541–544 can be rotated in either one of the circumferential directions, it is possible to rotate twisting tools 541–544 in one direction more than a half pole-pitch first and, then, back in the other direction just a half pole-pitch. Thus it is possible to prevent the deformation due to spring back of the coils.

When those of conductor segments 3 at the first and third layer are rotated a half pole-pitch in one direction and those of conductor segments 3 at the second and fourth layer are rotated a half pole-pitch in the other direction, those of conductor segments 3 in the first and second layers and those of conductor segments 3 in the third and fourth layers come close to each other. On the other hand, the distance between those of conductor segments 3 in the second and third layers is larger enough to be insulated from each other surely.

In FIG. 7, first and third twisting tools 541 and 543 from the outermost layer are clockwise rotated the same phase angle, second and fourth twisting tools 542 and 544 are counter-clockwise rotated the same phase angle. However, twisting tools 541–544 can be rotated in the directions opposite this embodiment to twist the legs of conductor segments 3.

The invention can be applied to various stator only by changing twisting tools 541–544. For example, the invention can be applied to not only a stator having 36 slots but also a stator having more slots such as 48 slots, 84 slots or 96 slots by changing twisting tools 541–544.

Figure 11:
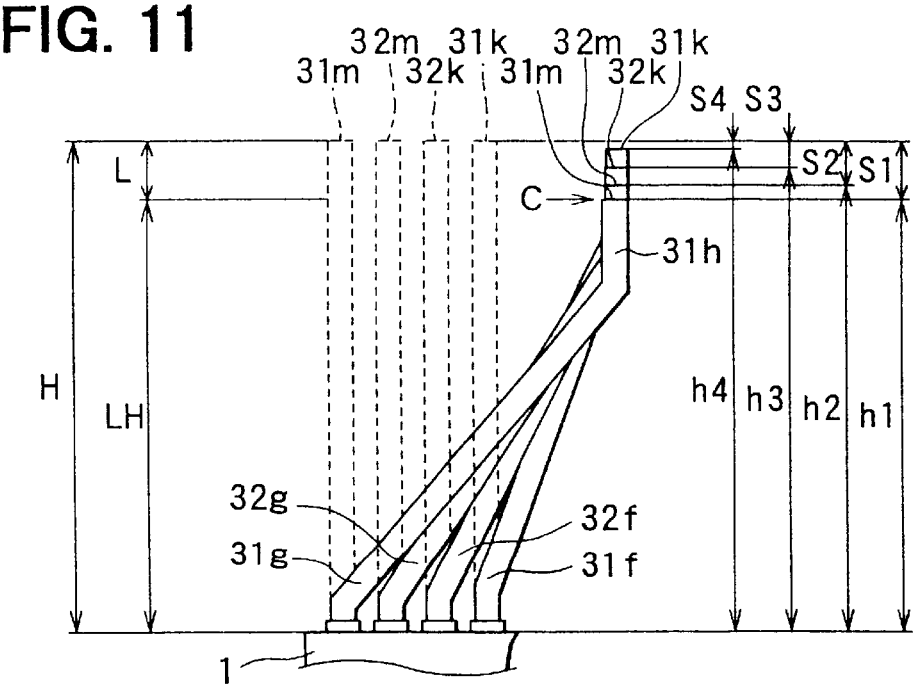
FIG. 11 is a schematic side view illustrating the conductor segments before and after being twisted by a method according to a second embodiment of the invention.

A stator core according to a second embodiment is described with reference to FIG. 11.

In the drawing, broken lines illustrate the conductor segments 3 before the legs are twisted, and solid lines illustrate conductor segments after the legs are twisted. Portions omitted in the drawing are the same as those shown in the drawings for the first embodiment.

Conductor segments 3 before being twisted are the same in height H with each other. Then, grip portions 31i, 32i, 32h and 31h are held so that distance LH in the core-axis direction between each of grip portions 31h, 31i, 32h, 32i and the end of stator core and the length L of grip portions 31h, 31i, 32h, 32i can be the same with each other.

Thereafter, twisting tools 541–544 are rotated the same angle in the predetermined directions. At the same time, each of twisting tools 541–544 is separately moved up or down to correspond to the movement of grip portions 31i, 32i, 32h and 31h in response to the rotation of twisting tools 541–544. As a result, the height of the grip end after being twisted is lower as it is disposed more radially outside.

Subsequently, grip portions 31i, 32i, 32h and 31h are cut at portion C to remove portions near grip ends 31m, 32m, 32k and 31k, so that all the ends of conductor segments 3 can have the same height.

Because the grip portions 31i, 32i, 32h and 31h are differently positioned in the core-axis direction after being twisted, second inclined portions 31f, 31g, 32f and 32g do not extensively overlap each other. Therefore, cooling air directly blows on second inclined portions 31f, 31g, 32f and 32g to effectively cool the same.

Since grip portions 31i, 32i, 32h and 31h are machined to have the same height, grip portions 31i, 32i, 32h and 31h can be welded easily and surely.

Figure 12:
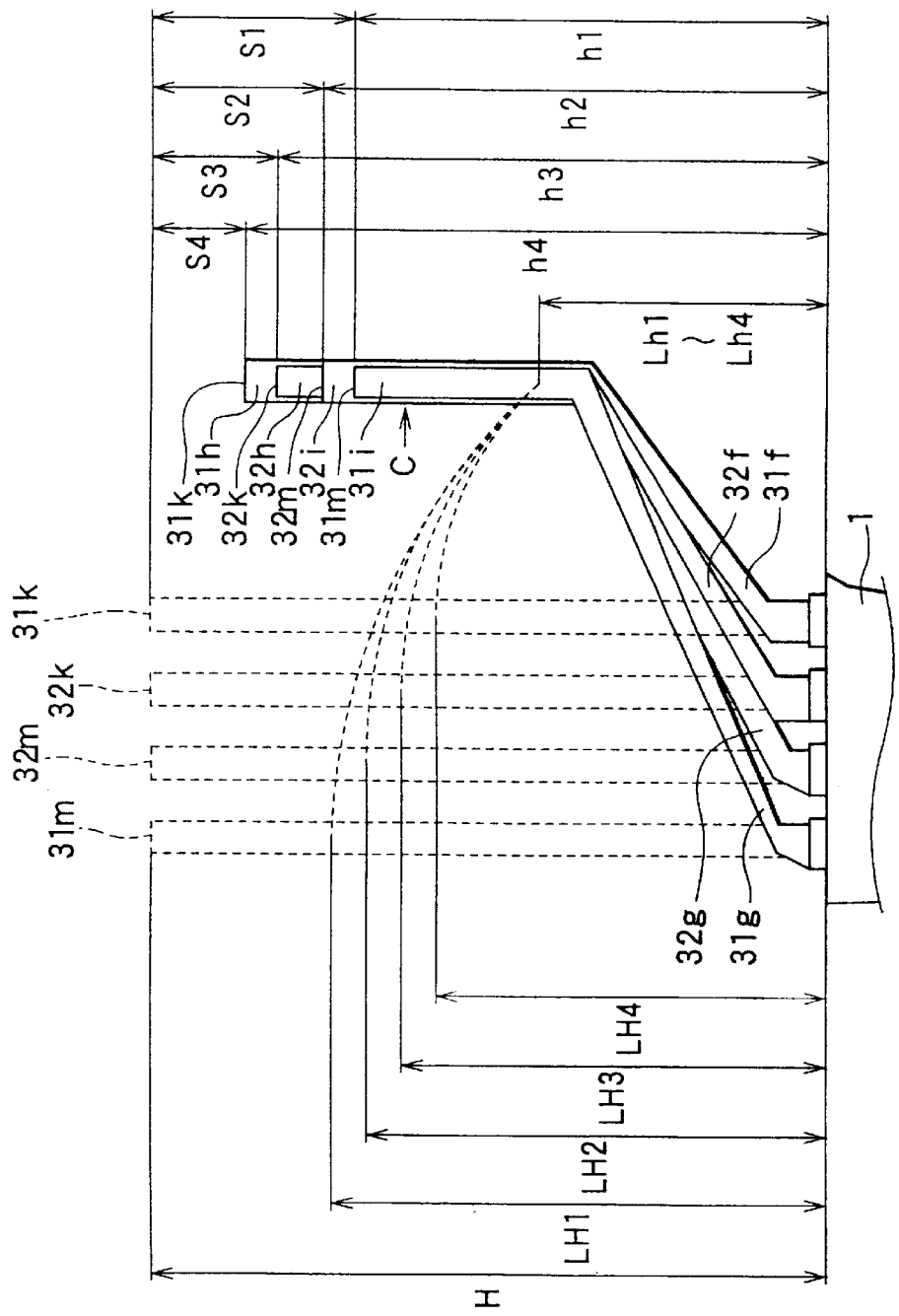
FIG. 12 is a schematic side view illustrating the conductor segments before and after being twisted by a method according to a third embodiment of the invention.

A stator core according to a third embodiment of the invention is described with reference to FIG. 12. In the drawing, broken lines illustrate conductor segments 3 before being twisted, and solid lines illustrate conductor segments 3 after being twisted. Portions omitted in the drawing are the same as those shown in the drawings for the first embodiment.

The straight legs of conductor segments 3 are the same in height H with each other before the legs are twisted. Then, grip portions 31*i*, 32*i*, 32*h* and 31*h* are held so that length LH1–LH4 between grip portions 31*i*, 32*i*, 32*h* and 31*h* and the stator core's end, which correspond to the lengths of second inclined portions 31*g*, 32*g*, 32*f* and 31*f*, are arranged so that the distance at radially more outside is longer. Then, twisting tools 541–544 are rotated the same angle in the prescribed directions. At the same time, each of twisting tools 541–544 is separately moved up or down to correspond to the motion of grip portions 31*i*, 32*i*, 32*h* and 31*h* in response to the rotation of twisting tools 541–544.

The grip portion's distances LH1–LH4 are arranged so that the distance at radially more outside can be longer, thereby, to equalize the grip portion's height Lh1–Lh4 after being twisted. In addition, distances S1–S4 of the vertical stroke of twisting tools 541–544 are respectively determined. With regard to the height h1–h4 of grip ends 31*k*, 32*k* 32*m* and 31*m* after being twisted, the grip end disposed in radially more outside layer is lower.

Subsequently, grip portions 31*i*, 32*i*, 32*h* and 31*h* are cut at portion C so that all conductor segments 3 can have the same height. Thus, those of grip portions 31*h* and 32*h* and grip portions 32*i* and 31*i* that are adjacent to each other can be welded easily and surely.

Figure 13:
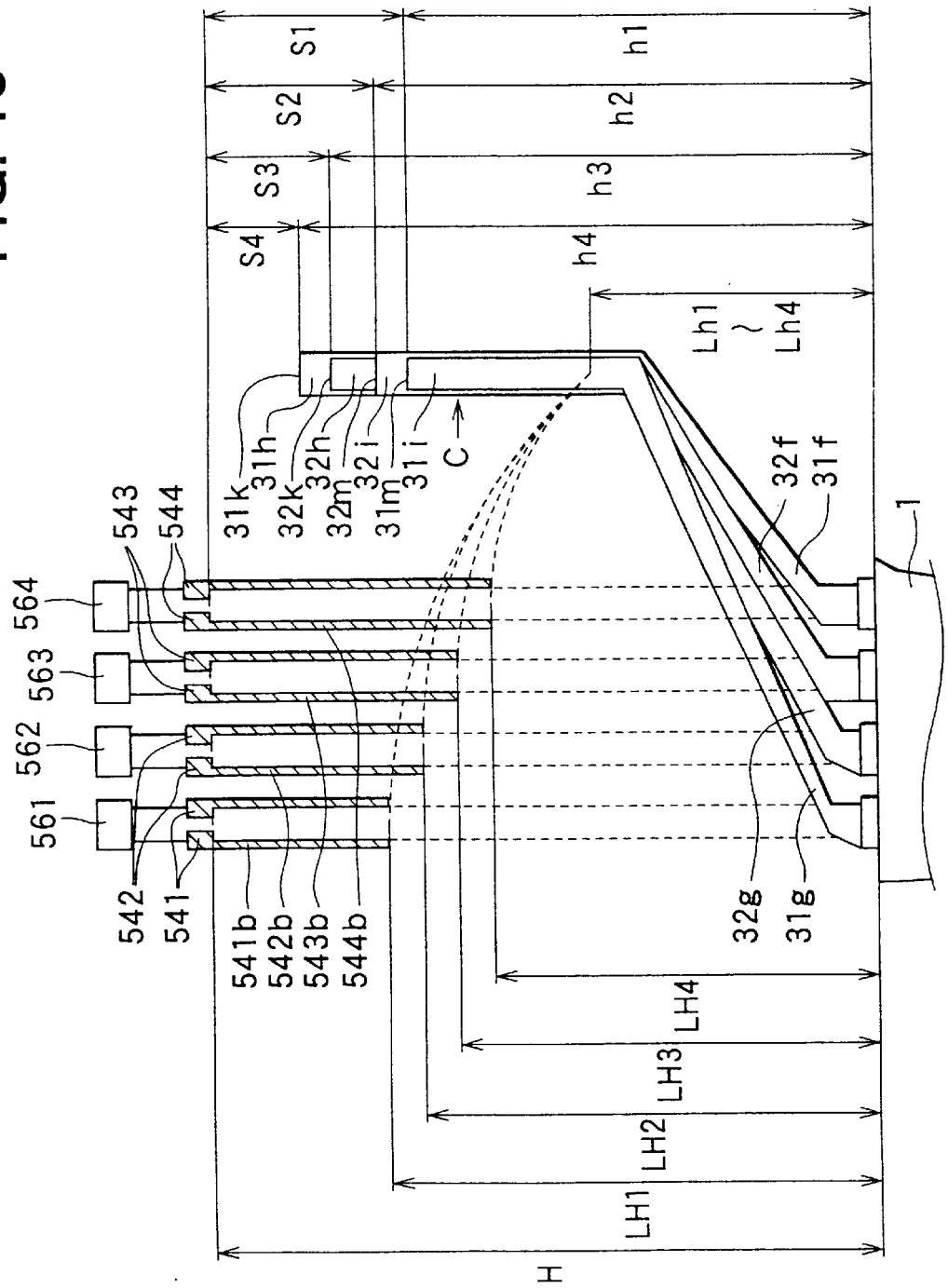
FIG. 13 is a schematic side view illustrating the segments before and after being twisted by a method according to a fourth embodiment of the invention.

A stator core according to a fourth embodiment of the invention is described with reference to FIG. 13.

In the drawing, broken lines illustrate conductor segments 3 before the legs thereof are twisted, and solid lines illustrate conductor segments 3 after the legs thereof are twisted. Portions omitted in the drawing are the same as those shown in the drawings for the first embodiment.

This embodiment has a different means of holding grip portions 31*i*, 32*i*, 32*h* and 31*h* from the method according to the above embodiments.

Each of twisting tools 541–544 is comprised of a pair of coaxial cylinders. Grip portions 31*i*, 32*i*, 32*h* and 31*h* are inserted into slits of holding members 541*b*–544*b* until grip ends 31*m*, 32*m*, 32*k* and 31*k* respectively abut the bottoms of the slits. Thereafter, one of the pair of cylinders is rotated in a direction opposite to the other so that grip portions 31*i*, 32*i*, 32*h* and 31*h* are held between opposite sides thereof in the circumferential direction.

The depths of the slits of holding members 541*b*–544*b* are formed so that the depth at radially more outside is shallower. Therefore, grip portion's distances LH1–LH4 before being twisted are arranged so that the distance at radially more outside is longer.

The height H of the legs before being twisted is the same with all the conductor segments extending from different layers of slots. Then, grip portions 31*i*, 32*i*, 32*h* and 31*h* are held between opposite sides in the core-circumference direction, and twisting tools 541–544 are rotated the same angle while each of twisting tools 541–544 is separately moved up or down to correspond to the movement of grip portions 31*i*, 32*i*, 32*h* and 31*h* in response to the rotation of twisting tools 541–544. With regard to the grip portion s distance LH1–LH4 before being twisted, the radially more outside is made longer so that the grip portion's heights Lh1–Lh4 after being twisted can be made equal. At the same time, the distance S1–S4 of the up-down stroke of twisting tools 541–544 are determined.

The twisting step is carried out while grip end 31*k*, 31*m*, 32*k* and 32*m* and opposite sides of grip portions 31*i*, 32*i*, 32*h* and 31*h* in the core-circumference direction are restricted. Therefore, grip portions 31*i*, 32*i*, 32*h* and 31*h* are prevented from slipping off in holding members 541*b*–544*b*, so that grip portion 31*h*, 31*i*, 32*h* and 32*i* can be protected from damage.

Figure 14:
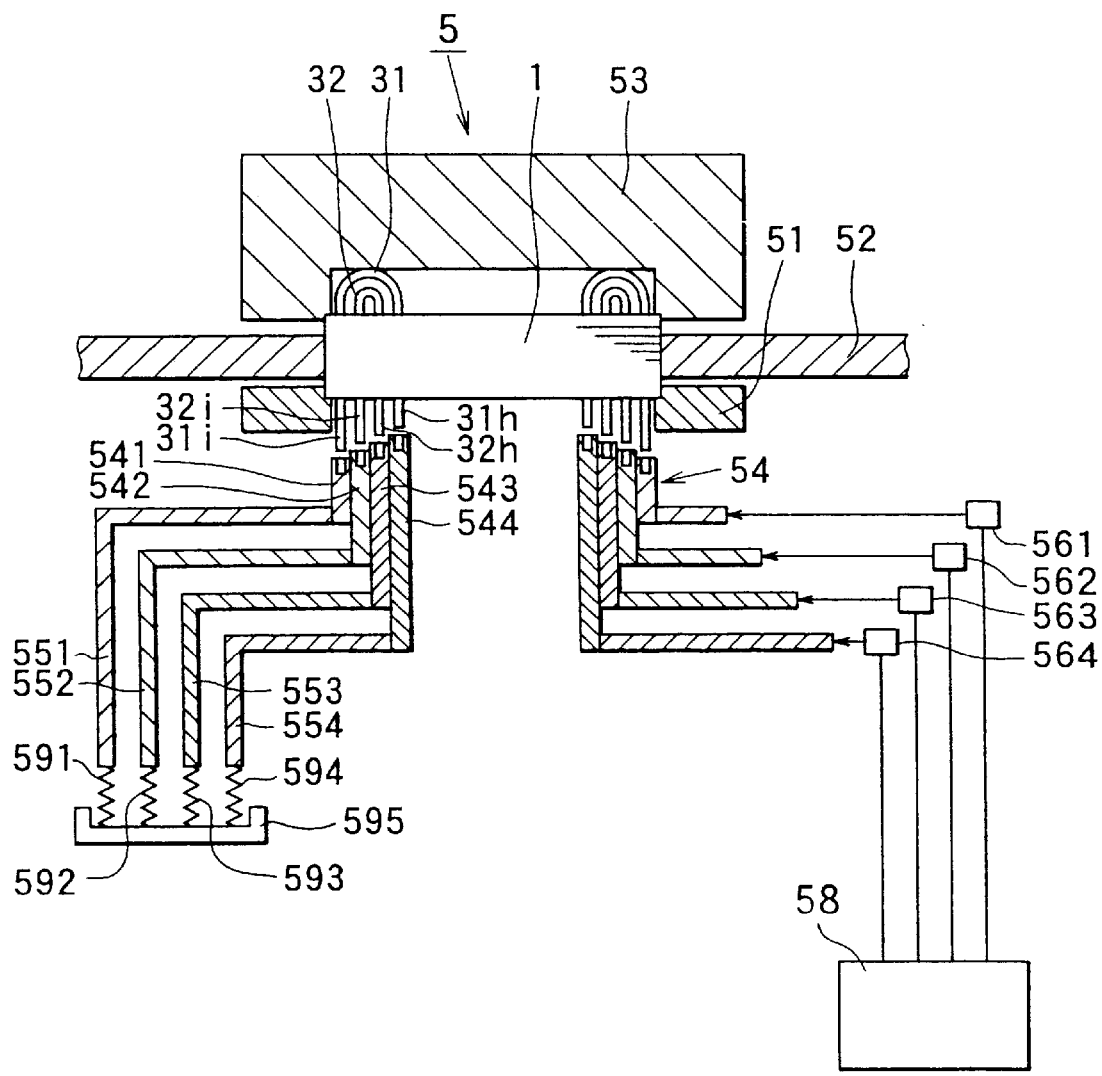
FIG. 14 is a schematic cross-sectional diagram illustrating a twisting apparatus according to a fifth embodiment of the invention.

A stator coil twisting apparatus 5 according to a fifth embodiment of the invention is described with reference to FIG. 14. Portions omitted in the drawing are the same as those shown in the drawings for the first embodiment.

Twisting tool 541–544 moves along with the movement of grip portions 31*i*, 32*i*, 32*h* and 31*h* in the core-axis direction in response to the rotation of twisting tools 541–544.

Axial drive unit 59 is comprised of springs 591–594 that separately bias each of twisting tools 541–554 via cylindrical shafts 551–554 and spring holder 595 for holding respective one-ends of springs 591–594.

Firstly, spring holder 595 is lowered to move down twisting tools 541–544, to set stator core 1 on worktable 51.

Then, spring holder 595 is raised to move up twisting tools 541–544 to insert grip portions 31*i*, 32*i*, 32*h* and 31*h* into the cavities of holding members 541*b*–544*b*. Twisting tools 541–544 stop at positions when grip ends 31*m*, 32*m*, 32*k* and 31*k* of grip portion 31*h*, 31*i*, 32*h* and 32*i* abut the cavity's bottoms of holding members 541*b*–544*b*. While twisting tools 541–544 stop, spring holder 595 is further raised to compress spring 591–594.

Subsequently, twisting tools 541–544 are rotated by circumferential drive unit 561–564 to move grip portions 31*i*, 32*i*, 32*h* and 31*h* in the core-circumference directions. At this stage, grip portions 31*i*, 32*i*, 32*h* and 31*h* also move in the core-axis direction in response to the core-circumferential movement thereof. Since twisting tools 541–544 are biased by springs 591–594, twisting tools 541–544 moves in the core-axis direction to follow the core-axial movement of grip portions 31*i*, 32*i*, 32*h* and 31*h*.

Because twisting tools 541–544 moves in the core-axis directions to follow the core-axial movement of the grip portions 31*i*, 32*i*, 32*h* and 31*h*, grip portions 31*i*, 32*i*, 32*h* and 31*h* can be held in holding members 541*b*–544*b*.

Although U-shaped segments are used in the above embodiments, I-shaped segments can be used in the similar manner. The present invention can be applied to a method of manufacturing a stator of various rotary electric machine other than the vehicle ac generator.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. An apparatus for manufacturing a stator of a rotary electric machine including a cylindrical stator core with a plurality of slots and a plurality of conductor segments respectively disposed in said slots in a plurality of radially aligned layers, said apparatus comprising:

means for holding each of said conductor segments at grip portions;

second means for driving said first means to shift said grip portions in a prescribed circumferential direction of said stator core; and third means for driving said first means to shift said grip portions separately from one another in an axial direction of said stator core to locate those of said grip portions to be connected adjacent to each other.

2. The apparatus as claimed in claim 1, wherein said first means comprises a plurality of twisting tools which respectively shift said grip portions separately from one another in circumferential and axial directions of said stator core.

3. The apparatus as claimed in claim 1, wherein said second means comprises a plurality of twisting tools for respectively shifting said grip portions the same angle in said circumferential direction, and said third means comprises a plurality of axial drive units for respectively shifting said grip portions in said axial direction under all heights of said grip portions become equal.

4. An apparatus for manufacturing a stator of a rotary electric machine including a cylindrical stator core with a plurality of slots and a plurality of conductor segments respectively disposed in said slots in a plurality of radially aligned layers, said apparatus comprising:

a plurality of twisting tools for respectively shifting said grip portions separately from one another in circumferential and axial directions of said stator core;

a plurality of circumferential drive units for respectively driving said twisting tools in a circumferential direction;

a plurality of axial drive units for respectively driving said twisting tools in an axial direction of said stator core to locate those of said grip portions to be connected adjacent to each other.

5. The apparatus as claimed in claim 4, wherein each of said twisting tools has means for holding said grip portions.

* * * * *